(12) United States Patent
Kunito et al.

(10) Patent No.: US 8,516,081 B2
(45) Date of Patent: Aug. 20, 2013

(54) DELIVERY SERVER, CONTENT DELIVERY METHOD IN DELIVERY SERVER AND MULTICAST SERVER, CONTENT DELIVERY METHOD IN MULTICAST SERVER

(75) Inventors: Yoshiyuki Kunito, Kanagawa (JP); Yasuto Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 12/723,160

(22) Filed: Mar. 12, 2010

(65) Prior Publication Data

US 2010/0257257 A1   Oct. 7, 2010

(30) Foreign Application Priority Data

Apr. 2, 2009  (JP) ................................ 2009-089698

(51) Int. Cl.
*G06F 15/16*   (2006.01)

(52) U.S. Cl.
USPC ......................................................... 709/219

(58) Field of Classification Search
None
See application file for complete search history.

(56) References Cited

U.S. PATENT DOCUMENTS

| | | | | |
|---|---|---|---|---|
| 6,085,251 | A * | 7/2000 | Fabozzi, II | 709/230 |
| 6,377,996 | B1 * | 4/2002 | Lumelsky et al. | 709/231 |
| 6,415,323 | B1 * | 7/2002 | McCanne et al. | 709/225 |
| 6,760,765 | B1 * | 7/2004 | Asai et al. | 709/226 |
| 6,901,445 | B2 * | 5/2005 | McCanne et al. | 709/225 |
| 7,155,475 | B2 * | 12/2006 | Agnoli et al. | 709/201 |
| 7,174,373 | B1 * | 2/2007 | Lausier | 709/223 |
| 7,383,564 | B2 * | 6/2008 | White et al. | 725/89 |
| 7,680,938 | B2 * | 3/2010 | Oesterreicher et al. | 709/226 |
| 2002/0026560 | A1 * | 2/2002 | Jordan et al. | 711/120 |
| 2002/0056131 | A1 * | 5/2002 | Hayashi et al. | 725/115 |
| 2002/0120741 | A1 * | 8/2002 | Webb et al. | 709/225 |
| 2003/0101265 | A1 * | 5/2003 | Dantzig et al. | 709/226 |
| 2003/0105865 | A1 * | 6/2003 | McCanne et al. | 709/225 |
| 2005/0262246 | A1 * | 11/2005 | Menon et al. | 709/226 |
| 2006/0095945 | A1 * | 5/2006 | Carpenter et al. | 725/87 |
| 2006/0136581 | A1 * | 6/2006 | Smith | 709/224 |
| 2007/0033609 | A1 * | 2/2007 | Dei | 725/25 |
| 2007/0147375 | A1 * | 6/2007 | Lee et al. | 370/390 |
| 2007/0168523 | A1 * | 7/2007 | Jiang et al. | 709/228 |
| 2009/0010193 | A1 * | 1/2009 | Kolenchery | 370/312 |
| 2009/0144400 | A1 * | 6/2009 | Kunito | 709/220 |
| 2009/0182843 | A1 * | 7/2009 | Hluchyj et al. | 709/219 |
| 2010/0257257 | A1 * | 10/2010 | Kunito et al. | 709/219 |
| 2011/0134808 | A1 * | 6/2011 | Thyni et al. | 370/270 |

FOREIGN PATENT DOCUMENTS

| | | |
|---|---|---|
| JP | 2004-7228 | 1/2004 |
| JP | 2004-110277 | 4/2004 |
| JP | 2005-327155 | 11/2005 |

* cited by examiner

*Primary Examiner* — Jerry Dennison
(74) *Attorney, Agent, or Firm* — Oblon, Spivak, McClelland, Maier & Neustadt, L.L.P.

(57) ABSTRACT

A delivery server, includes: a content output unit outputting a content; a delivery request receiving unit receiving a delivery request transmitted from a client terminal connected to a network; a determination unit determining whether the content can be delivered to the client terminal in response to the delivery request when the delivery request is received by the delivery request receiving unit; and a transmitting unit delivering the content outputted from the content output unit to the client terminal of a transmission source of the delivery request received by the delivery request receiving unit when it is determined that the delivery can be performed by the determination unit, and transmitting the content outputted from the content output unit to a multicast server connected to the network as well as transmitting a transfer command on which information of the multicast server is put to the client terminal of the transmission source of the delivery request received by the delivery request receiving unit when it is determined that the delivery is not able to be performed by the determination unit.

11 Claims, 13 Drawing Sheets

DELIVERY SERVER, CONTENT DELIVERY
METHOD IN DELIVERY SERVER AND
MULTICAST SERVER, CONTENT DELIVERY
METHOD IN MULTICAST SERVER

BACKGROUND OF THE INVENTION

1. Field of the Invention

The present invention relates to a delivery server and a content delivery method in the delivery server as well as a multicast server and a content delivery method in the multicast server, and particularly relates to a delivery server and the like delivering contents such as video and music to client terminals through a network.

2. Description of the Related Art

In recent years, a movement toward construction of a Next Generation Network (NGN) which replaces a telephone network in a circuit switching system of related art with a network constructed based on an IP (Internet Protocol) technology becomes active. The NGN has a band guarantee function and a security function in the network itself, in which session control is performed by using a Session Initiation Protocol (SIP).

In the above NGN, a client terminal is capable of receiving delivery of contents such as video and music from a delivery server. In this case, it is extremely difficult to know how much there are delivery requests from client terminals to the delivery server and to identify server resources necessary at that time.

Systems in which contents such as video and music from the delivery server (a content providing server) to client terminals (user terminals) are delivered through a network such as Internet are described in, for example, JP-A-2004-110277 (Patent Document 1), JP-A-2005-327155 (Patent Document 2) and JP-A-2004-7228 (Patent Document 3).

FIG. 14 shows a state in which streaming delivery of taken image data is performed from a camera server 210 as the delivery server to client terminals 220a to 220c through a network 230. The number of streaming deliveries which can be performed by one camera server 210 is limited due to the CPU (Central Processing Unit) power and so on. In this case, when streaming delivery with high image quality is performed, the number of deliveries is further limited.

Accordingly, load balancing systems have been proposed in order to increase the number of deliveries in related art. As the load balancing system, there exists load balancing by a DNS (Domain Name System) as shown in FIG. 15. In the load balancing system, when there is an inquiry about an IP address of the delivery server from a client terminal 220 to a DNS server 240, the DNS server 240 notifies the client terminal 220 of IP addresses of a delivery server (server 0) 210a to a delivery server (server 2) 210c by sequentially allocating IP addresses of these servers, as a result, loads of respective servers are balanced.

Also as the load balancing system, there exists load balancing by a load balancer (switch) as shown in FIG. 16. In the load balancing system, when there is an inquiry about the IP address of the delivery server from the client terminal 220 to the DNS server 240, the DNS server 240 notifies an IP address of a load balancer 250, and the load balancer 250 sequentially allocates the delivery server (server 0) 210a to the delivery server (server 2) 210c, as a result, loads of respective servers are balanced.

Additionally, multicast systems are proposed in order to increase the number of deliveries in related art. As the multicasting systems, an IP multicasting, an application-level multicasting and the like are known.

SUMMARY OF THE INVENTION

In the above load balancing system by the DNS server 240, the load balancing system by the load balancer 250 and the IP multicasting, there are problems such that (a) it is difficult to be performed when the demand for the number of deliveries is not known in advance and that (b) initial investment is increased when the number of deliveries is assumed to be large. In the application-level multicasting, there are problems such that (a) a particular scheme is necessary in the client terminal because the delivery is performed in P2P, that (b) it is difficult to secure communication quality and that (c) management of connection history which is necessary when billing is performed is difficult. That is, the above-described load balancing systems and the multicast systems in related art are not appropriate when a delivery service business is desired to be started on a small scale.

It is desirable to allow the delivery service to start on a small scale.

According to an embodiment of the invention, there is provided a delivery server including a content output unit outputting a content, a delivery request receiving unit receiving a delivery request transmitted from a client terminal connected to a network, a determination unit determining whether the content can be delivered to the client terminal in response to the delivery request when the delivery request is received by the delivery request receiving unit and a transmitting unit delivering the content outputted from the content output unit to the client terminal of a transmission source of the delivery request received by the delivery request receiving unit when it is determined that the delivery can be performed by the determination unit, and transmitting the content outputted from the content output unit to a multicast server connected to the network as well as transmitting a transfer command on which information of the multicast server is put to the client terminal of the transmission source of the delivery request received by the delivery request receiving unit when it is determined that the delivery is not able to be performed by the determination unit.

According to an embodiment of the invention, there is provided a multicast server including a content receiving unit receiving a content delivered from a delivery server connected to the network and a content delivery unit performing multicasting of the content received by the content receiving unit to the network.

According to an embodiment of the invention, the delivery server, the client terminal and the multicast server are connected to one another through the network. As the network, for example, the NGN is used. The delivery server determines whether the content can be delivered by the delivery server itself in response to the delivery request when there is the delivery request from the client terminal. For example, when the number of deliveries is still small as compared with delivery performance of the delivery server itself, the delivery server determines that the delivery can be performed.

When it is determined that the content delivery can be performed in response to the deliver request, the delivery server delivers the content to the client terminal. For example, the delivery server includes the imaging unit which images an object and outputs taken image data corresponding to the object, delivering the taken image data outputted from the imaging unit as the content to the client terminal.

On the other hand, when it is determined that the delivery is not able to be performed in response to the delivery request, the content is transmitted from the delivery server to the multicast server as well as the transfer command on which information of the multicast server is put is transmitted from the delivery server to the client terminal. Accordingly, the content delivery is performed to the client terminal from the multicast server instead of the delivery server.

As described above, the delivery server delivers contents to client terminals by the delivery server itself while the number of deliveries is small and delivery requests from the client terminals can be responded, and is capable of delivering contents without using the multicast server, which allows the delivery service business to start on a small scale. When the number of deliveries is increased and it becomes difficult that the delivery server responds to the delivery request from the client terminal, the content delivery can be performed by using the multicast server, which flexibly addresses the increase in the number of deliveries.

According to the embodiment of the invention, when it is difficult to respond to the delivery request from the client terminal, the content is transmitted to the multicast server as well as the transfer command on which information of the multicast server is put is transmitted to the client terminal, then, the content is transmitted from the multicast server to the client terminal, which allows the delivery service to start on a small scale.

DETAILED DESCRIPTION OF THE INVENTION

Hereinafter, a best mode for carrying out the invention (referred to as an "embodiment" in the following description) will be explained. The explanation will be made in the following order.

1. Embodiment
2. Modification example

1. Embodiment

[Configuration of a Content Delivery System]

Figure 1:
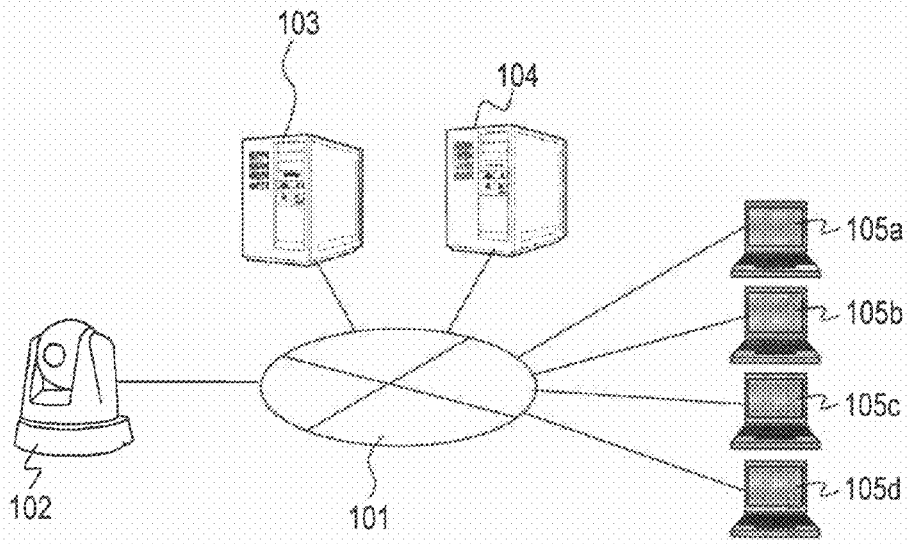
FIG. 1 is a block diagram showing a configuration example of a content delivery system according to an embodiment of the invention.

FIG. 1 shows a configuration example of a content delivery system 100 according to an embodiment of the invention. The content delivery system 100 has a configuration in which a camera server 102, a multicast server 103 and a SIP proxy server 104 and client terminals 105a to 105d are connected to an NGN 101 as a network. The camera server 102 is configured as a delivery server.

[Configuration of the Camera Server]

Figure 2:
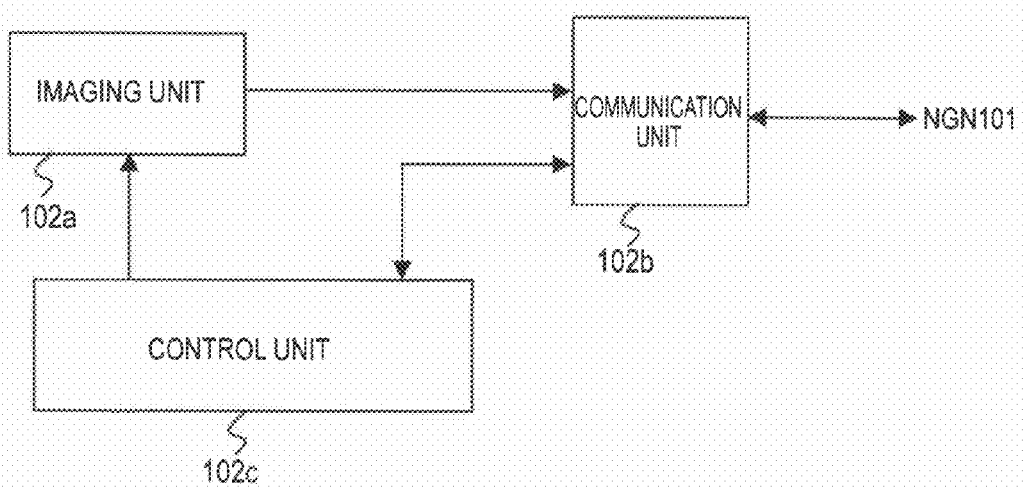
FIG. 2 is a block diagram showing a configuration example of a camera server.

FIG. 2 shows a configuration example of the camera server 102. The camera server 102 includes an imaging unit 102a, a communication unit 102b and a control unit 102c. The imaging unit 102a configures a content output unit, the communication unit 102b configures a delivery request receiving unit and a transmitting unit and the control unit 102c configures a determination unit and the transmitting unit.

The control unit 102c controls operation of the imaging unit 102a and the communication unit 102b. The imaging unit 102a images an object and outputs taken image data corresponding to the object. The communication unit 102 transmits the taken image data outputted from the imaging unit 102a to the client terminal or the multicast server according to need. The communication unit 102b performs necessary communication with the client terminals 105a to 105d, the multicast server 103 and the SIP proxy server 104.

When a delivery request transmitted from the client terminal is received by the communication unit 102b, the control unit 102c of the camera server 102 determines whether the camera server can transmit a content by the camera server itself to the client terminal in response to the delivery request or not. For example, when the number of deliveries is small with respect to delivery performance of itself, namely, the camera server 102, the control unit 102c determines that the delivery can be performed.

The control unit 102c, when determining that the delivery can be performed, controls the communication unit 102b to deliver taken image data (stream) outputted from the imaging unit 102a to the client terminal which has sent the delivery request. On the other hand, the control unit 102c, when determining the delivery is not able to be performed and the multicast server 103 can be used, controls the communication unit 102b to transmit the taken image data (stream) outputted from the imaging unit 102a to the multicast server 103. Then, the control unit 102c transmits a transfer command on which information of the multicast server 103 is put to the client terminal which has sent the delivery request.

[Processing Operation of the Control Unit of the Camera Server]

Figure 3:
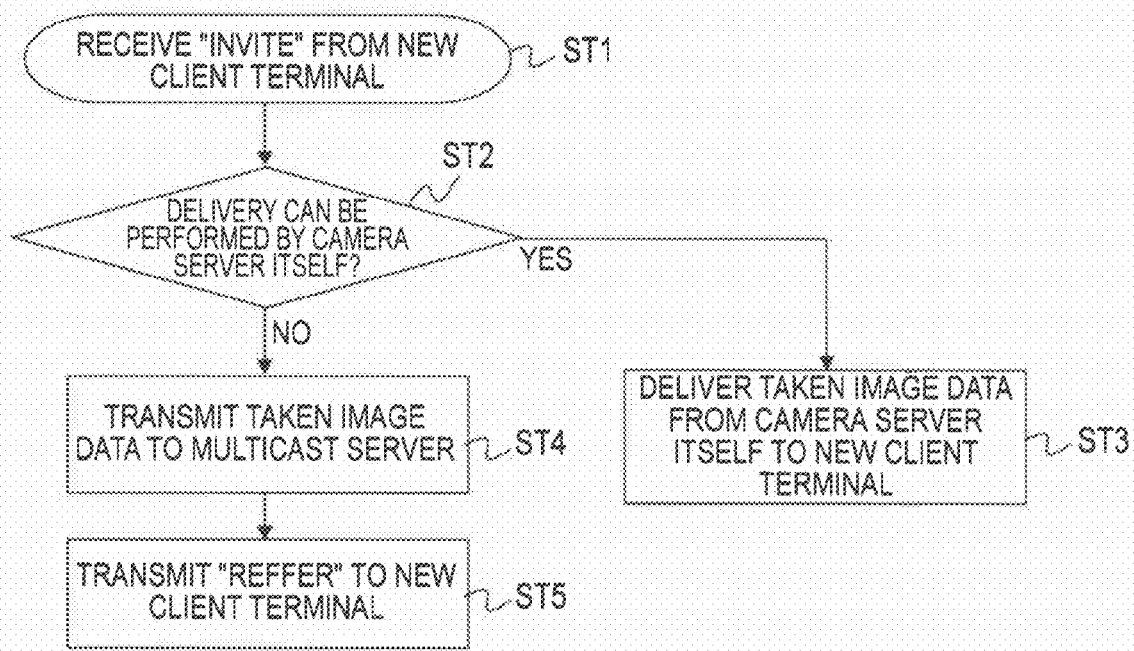
FIG. 3 is a flowchart showing a processing operation of a control unit of the camera server performed when a delivery request is performed by a new client terminal.

A flowchart in FIG. 3 shows a processing operation of the control unit 102c performed when the delivery request is sent by a new client terminal.

The control unit 102c starts the processing operation when receiving an INVITE method (delivery request) from a new client in Step ST1, proceeding to a processing of Step S2 after that. In Step ST2, the control unit 102c determines whether the delivery can be performed by the camera server 102 itself or not. When it is determined that the delivery can be performed, the control unit 102c delivers taken image data (stream) from the camera server 102 itself to the new client terminal in Step ST3.

When it is determined that the delivery is not able to be performed in Step ST2, the control unit 102c transmits taken image data (stream) from the camera server 102 itself to the multicast server 103 in Step ST4. Then, the control unit 102c transmits a transfer command on which information of the multicast server is put to the new client terminal in Step ST5. In this case, the taken image data (stream) is delivered to the new client terminal from the multicast server 103 instead of the camera server 102.

[Operation of the Content Delivery System]

Figure 4:
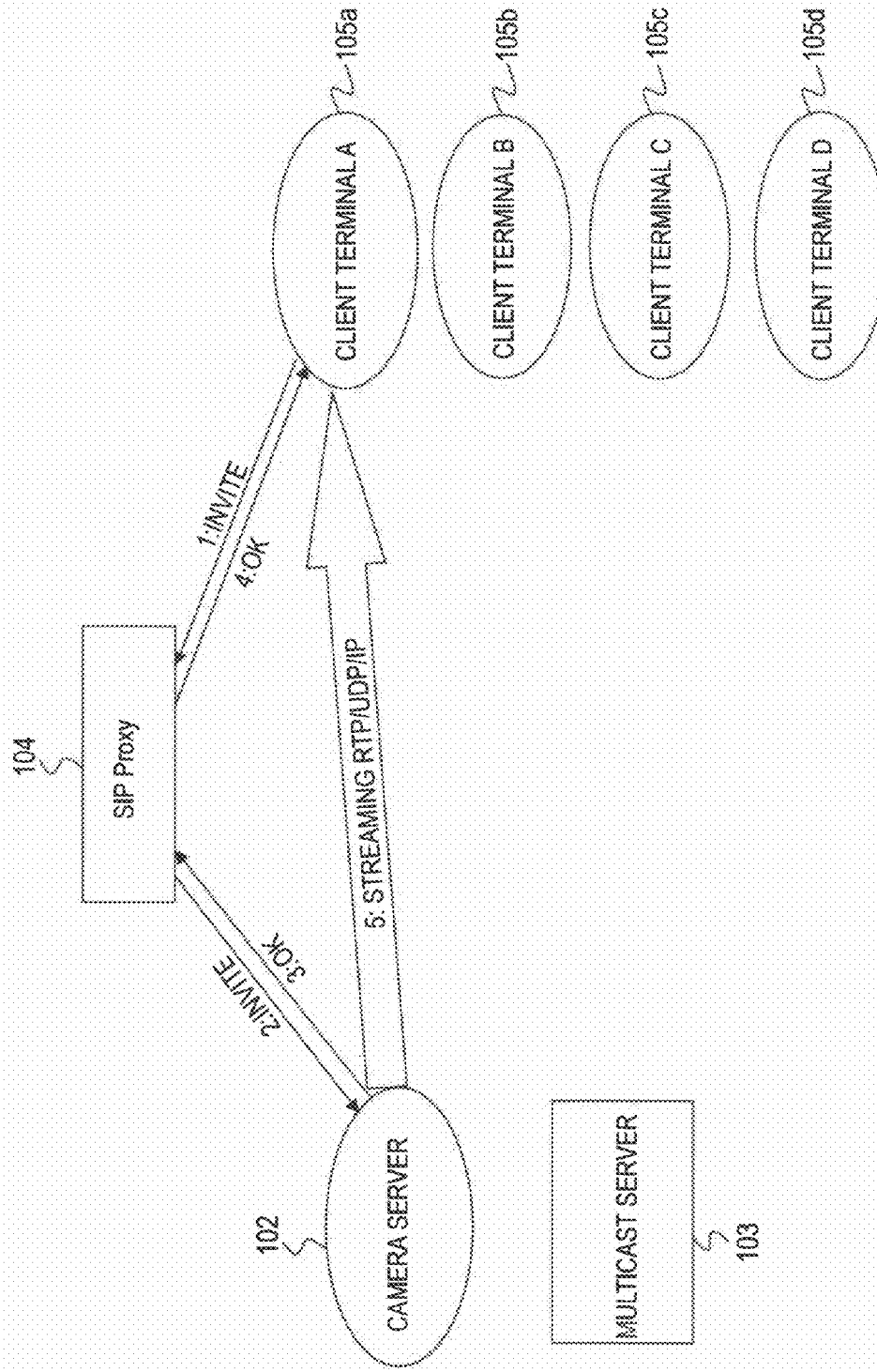
FIG. 4 is a block diagram for explaining an operation example of a content delivery system.
Figure 5:
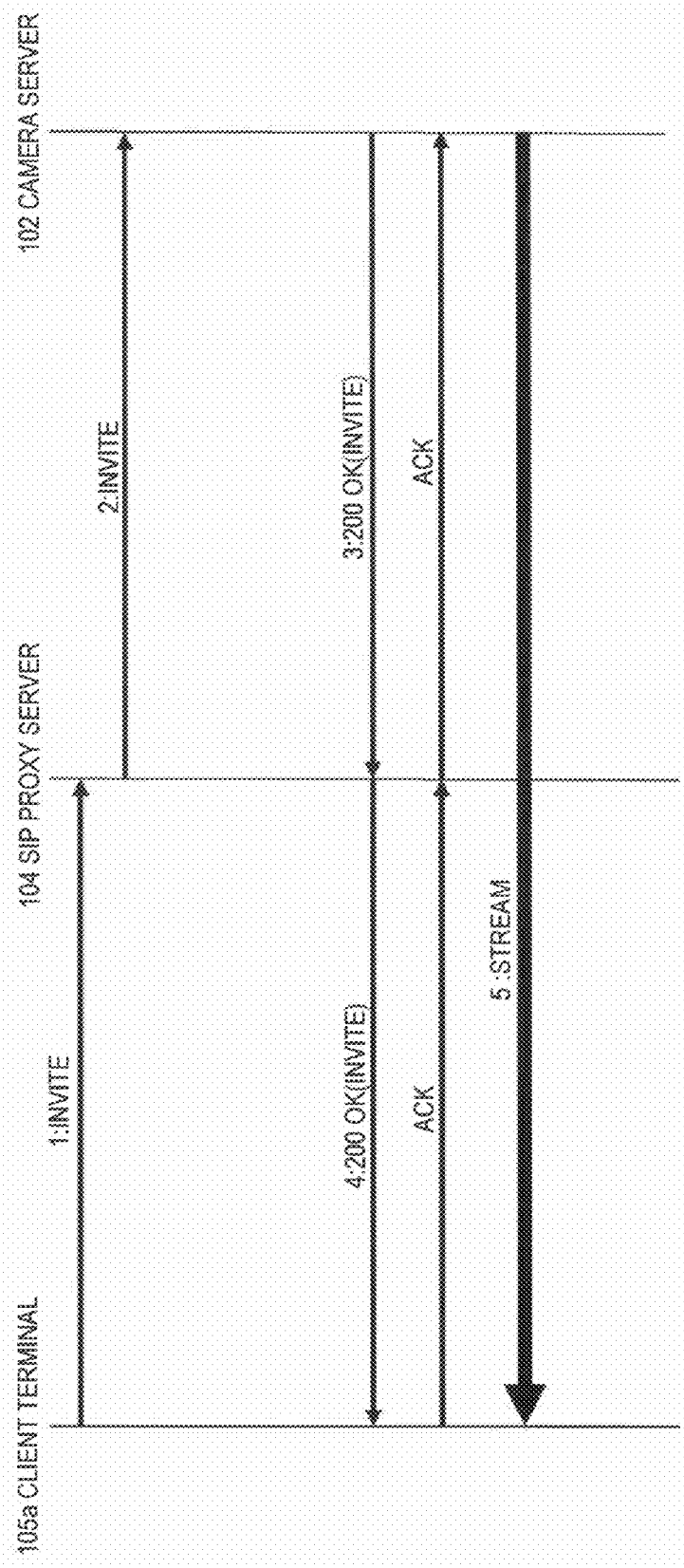
FIG. 5 is a sequence diagram for explaining an operation example of the content delivery system.

Next, operation examples of the content delivery system 100 shown in FIG. 1 will be explained. First, an operation example performed when the delivery request has been sent from the client terminal (client terminal A) 105a to the camera server 102 will be explained with reference to FIG. 4 and FIG. 5.

(1) The client terminal 105a transmits an INVITE method (delivery request) which is a session start request to the SIP proxy server 104. (2) The SIP proxy server 104 transfers the INVITE method received from the client terminal 105a to the camera server 102. The camera server 102 receives the INVITE method transferred from the SIP proxy server 104.

(3) The camera server 102 determines that the delivery can be performed by the camera server 102 itself with respect to the received INVITE method, transmitting a response code "200 OK" indicating that the delivery request by the INVITE method has been received to the SIP proxy server 104. (4) The SIP proxy server 104 transfers the response code "200 OK" received from the camera server 102 to the client terminal 105a. The client terminal 105a receives the response code "200 OK" transferred from the SIP proxy server 104.

Then, the client terminal 105a transmits an ACK method indicating that the response code "200 OK" has been received to the SIP proxy server 104. The SIP proxy server 104 transfers the ACK method received from the client terminal 105a to the camera server 102. The camera server 102 receives the ACK method transferred from the SIP proxy server 104.

(5) According to the above procedure, a session between the client terminal 105a and the camera server 102 is established, and the camera server 102 transmits (delivers) taken image data (stream) as a content to the client terminal 105a. As a transmission protocol of the taken image data (stream), for example, RTP (Real-Time Transport Protocol: IETF RFC 1890) is used.

Figure 6:
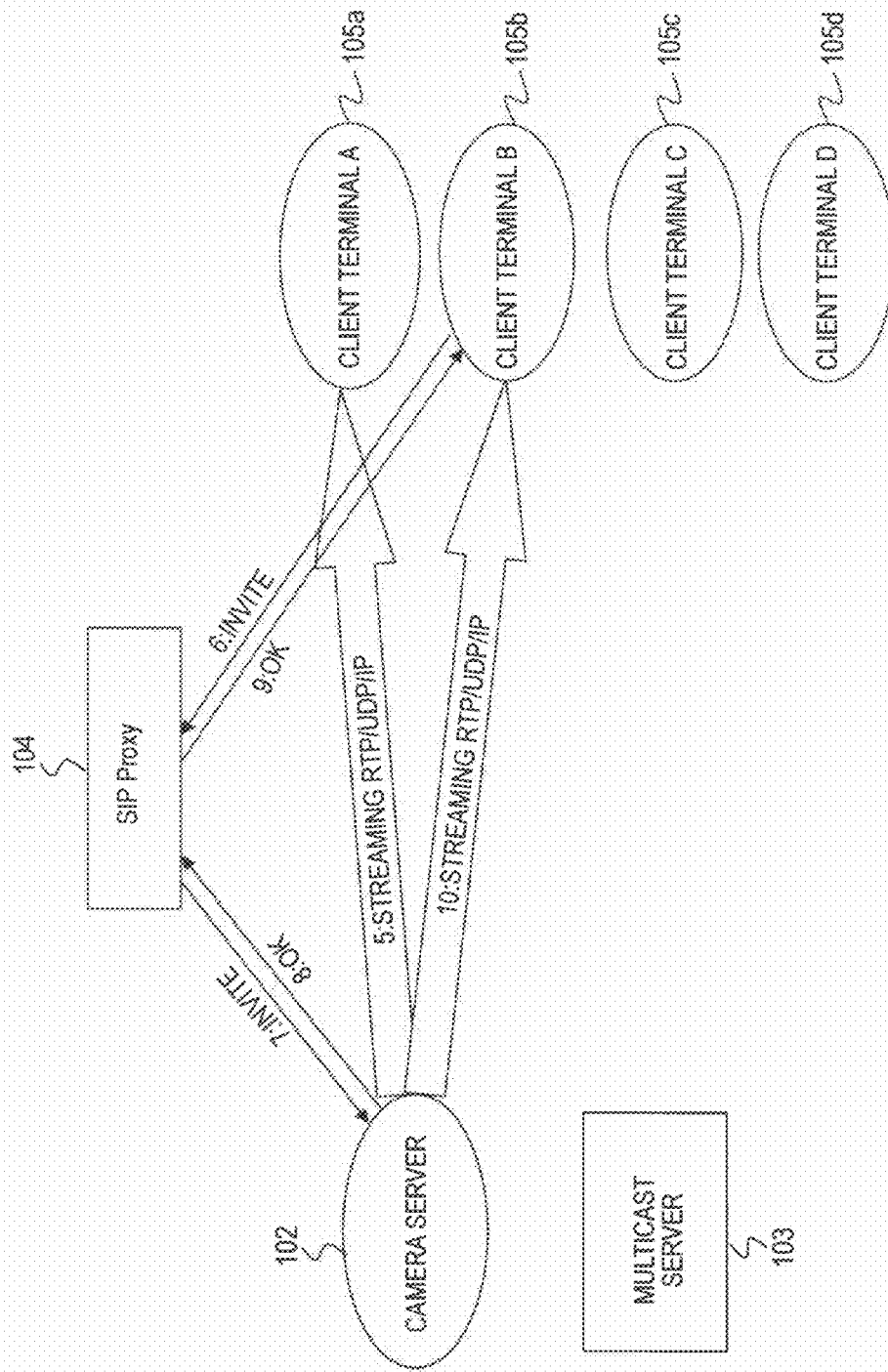
FIG. 6 is a block diagram for explaining an operation example of the content delivery system.
Figure 7:
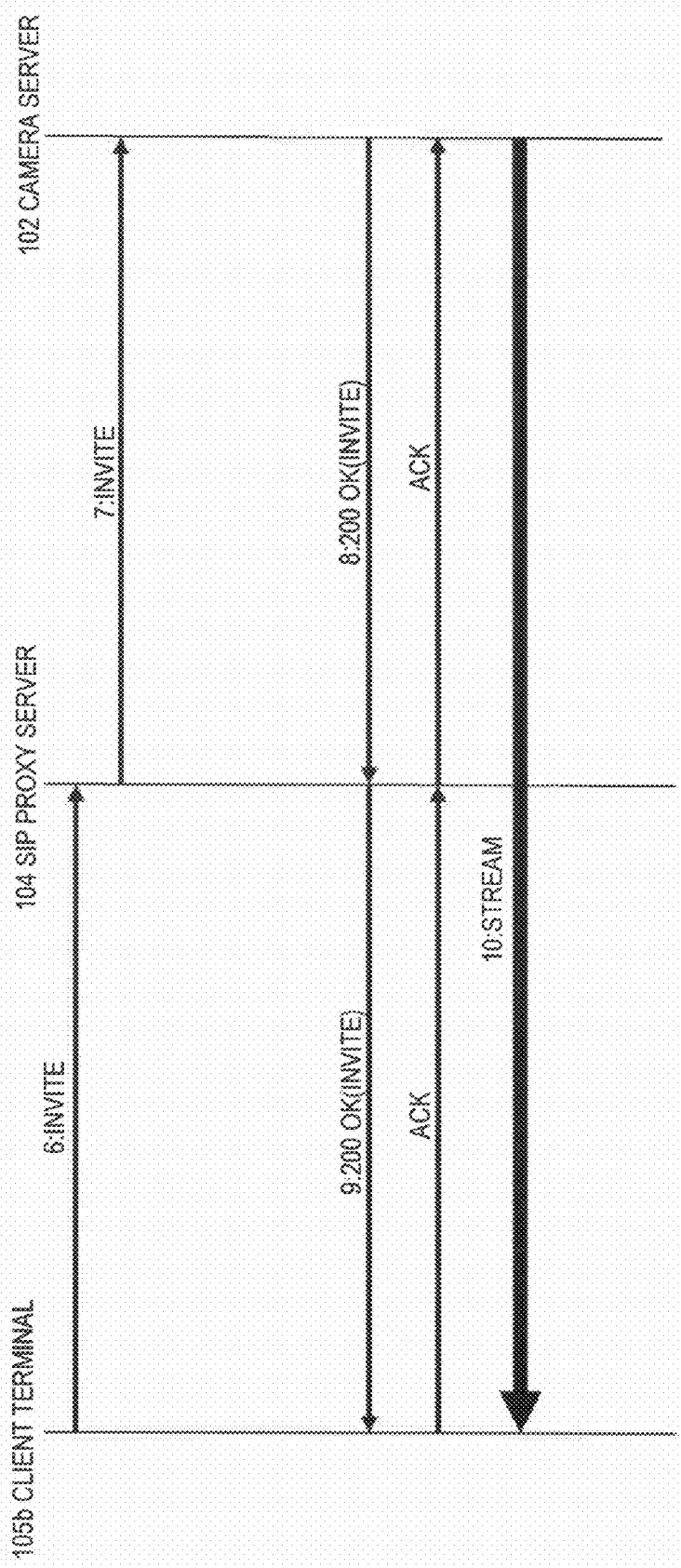
FIG. 7 is a sequence diagram for explaining an operation example of the content delivery system.

Next, an operation example performed when a delivery request is sent from the client terminal (client terminal B) 105b to the camera server 102 in a state in which taken image data (content) is delivered from the camera server 102 to the client terminal 105a as described above will be explained with reference to FIG. 6 and FIG. 7.

(6) The client terminal 105b transmits the INVITE method (delivery request) as the session start request to the SIP proxy server 104. (7) The SIP proxy server 104 transfers the INVITE method received from the client terminal 105b to the camera server 102. The camera server 102 receives the INVITE method transferred from the SIP proxy server 104.

(8) The camera server 102 determines that the delivery can be performed by the camera server 102 itself with respect to the received INVITE method, transmitting the response code "200 OK" indicating that the delivery request by the INVITE method has been received to the SIP proxy server 104. (9) The SIP proxy server 104 transfers the response code "200 OK" received from the camera server 102 to the client terminal 105b. The client terminal 105b receives the response code "200 OK" transferred from the SIP proxy server 104.

Then, the client terminal 105b transmits the ACK method indicating that the response code "200 OK" has been received to the SIP proxy server 104. The SIP proxy server 104 transfers the ACK method received from the client terminal 105b to the camera server 102. The camera server 102 receives the ACK method transferred from the SIP proxy server 104.

(10) According to the above procedure, a session between the client terminal 105b and the camera server 102 is established, and the camera server 102 transmits (delivers) taken image data (stream) as a content to the client terminal 105b.

Figure 8:
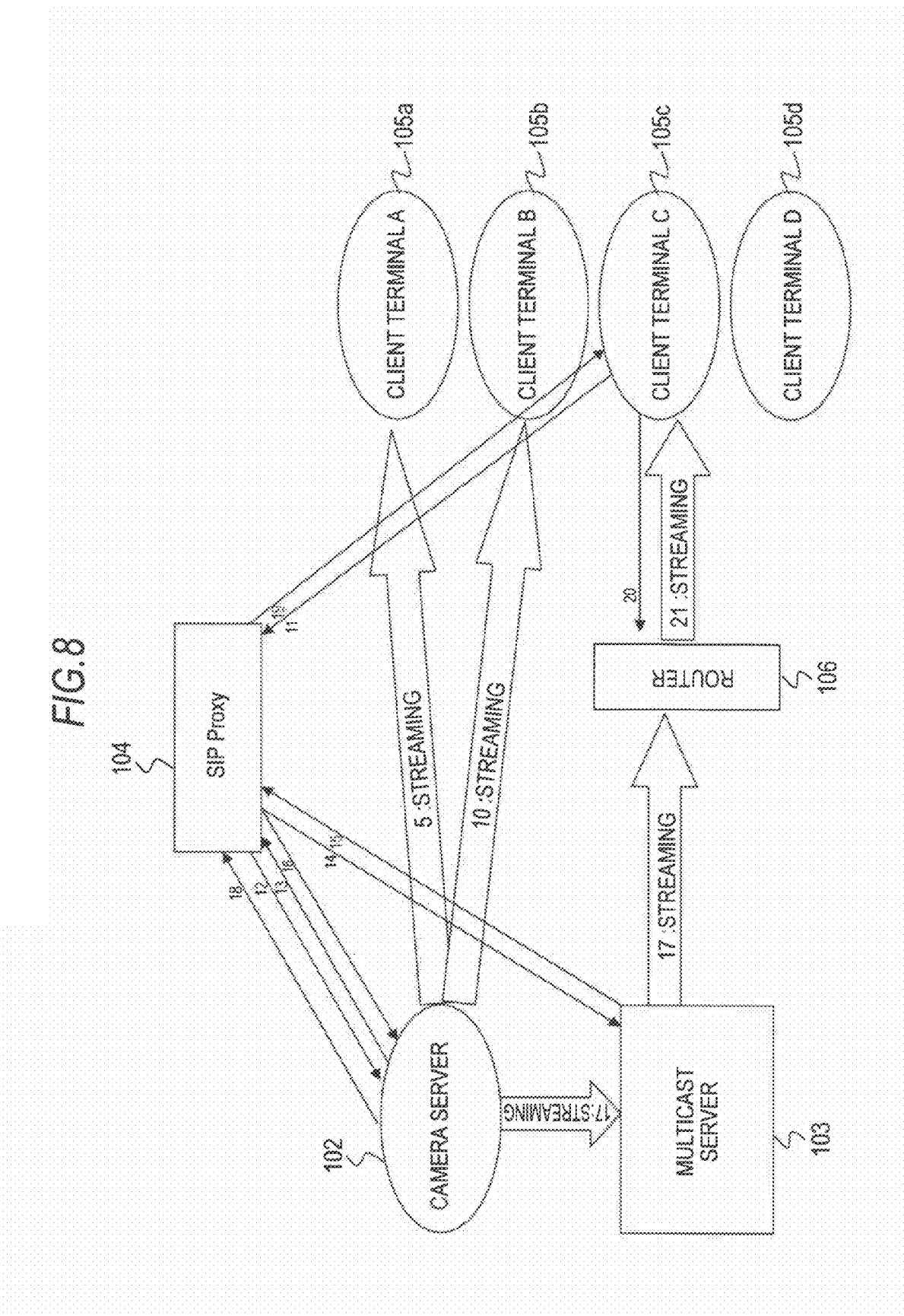
FIG. 8 is a block diagram for explaining an operation example of the content delivery system.
Figure 9:
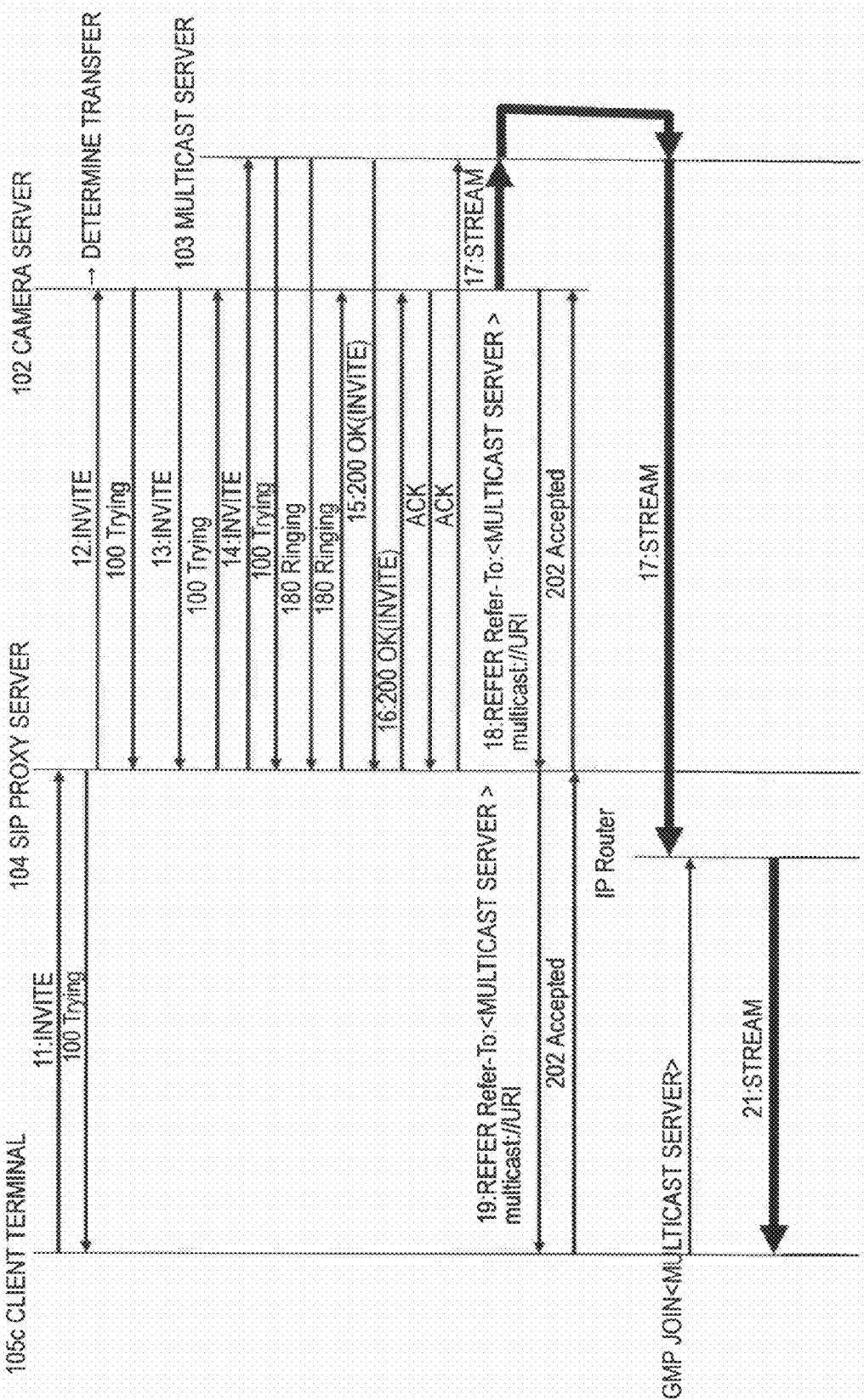
FIG. 9 is a sequence diagram for explaining an operation example of the content delivery system.

Next, an operation example performed when a delivery request is sent from the client terminal (client terminal C) 105c to the camera server 102 in a state in which taken image data (contents) is delivered from the camera server 102 to the client terminals 105a, 105b as described above will be explained with reference to FIG. 8 and FIG. 9.

(11) The client terminal 105c transmits the INVITE method (delivery request) as the session start request to the SIP proxy server 104. (12) The SIP proxy server 104 transfers the INVITE method received from the client terminal 105c to the camera server 102. The camera server 102 receives the INVITE method transferred from the SIP proxy server 104.

(13) The camera server 102 determines that the delivery is not able to be performed by the camera server 102 itself with respect to the received INVITE method, transmitting the INVITE method as the session start request to the SIP proxy server 104. (14) The SIP proxy server 104 transfers the INVITE method received from the camera server 102 to the multicast server 103. The multicast server 103 receives the INVITE method transferred from the SIP proxy server 104.

(15) The multicast server 103 transmits a response code "200 OK" indicating that the received session start request by the INVITE method has been accepted to the SIP proxy server 104. (16) The SIP proxy server 104 transfers the response code "200 OK" received from the multicast server 103 to the camera server 102. The camera server 102 receives the response code "200 OK" transferred from the SIP proxy server 104.

Then, the camera server 102 transmits the ACK method indicating that the response code "200 OK" has been received to the SIP proxy server 104. The SIP proxy server 104 transfers the ACK method received from the camera server 102 to the multicast server 103. The multicast server 103 receives the ACK method transferred from the SIP proxy server 104.

(17) According to the above procedure, a session between the camera server 102 and the multicast server 103 is established, and the camera server 102 transmits taken image data (stream) as a content to the multicast server 103. The multicast server 103 converts the received unicast stream into a multicast group address and performs multicasting to the network.

(18) The camera server 102 transmits a REFFER method as a transfer command on which information of the multicast server 103 is put to the SIP proxy server 104. (19) The SIP proxy server 104 transfers the REFFER method received from the camera server 102 to the client terminal 105c. The client terminal 105c receives the REFFER method transferred from the SIP proxy server 104.

The client terminal 105c transmits a response code "202 Accepted" indicating that the transfer request has been agreed to the SIP proxy server 104. The SIP proxy server 104 transmits the response code "202 Accepted" received from the client terminal 105c to the camera server 102. The camera server 102 receives the response code "202 Accepted" transferred from the SIP proxy server 104.

(20) Then, the client terminal 105c transmits an IMGP (Internet Group Management Protocol) JOIN message which is a request for joining in the multicast group to a connected router 106 based on the transfer request from the camera server 102.

(21) According to the above procedure, the client terminal 105c can receive taken image data (stream) as a content transmitted from the camera server 102 through the multicast server 103.

Figure 10:
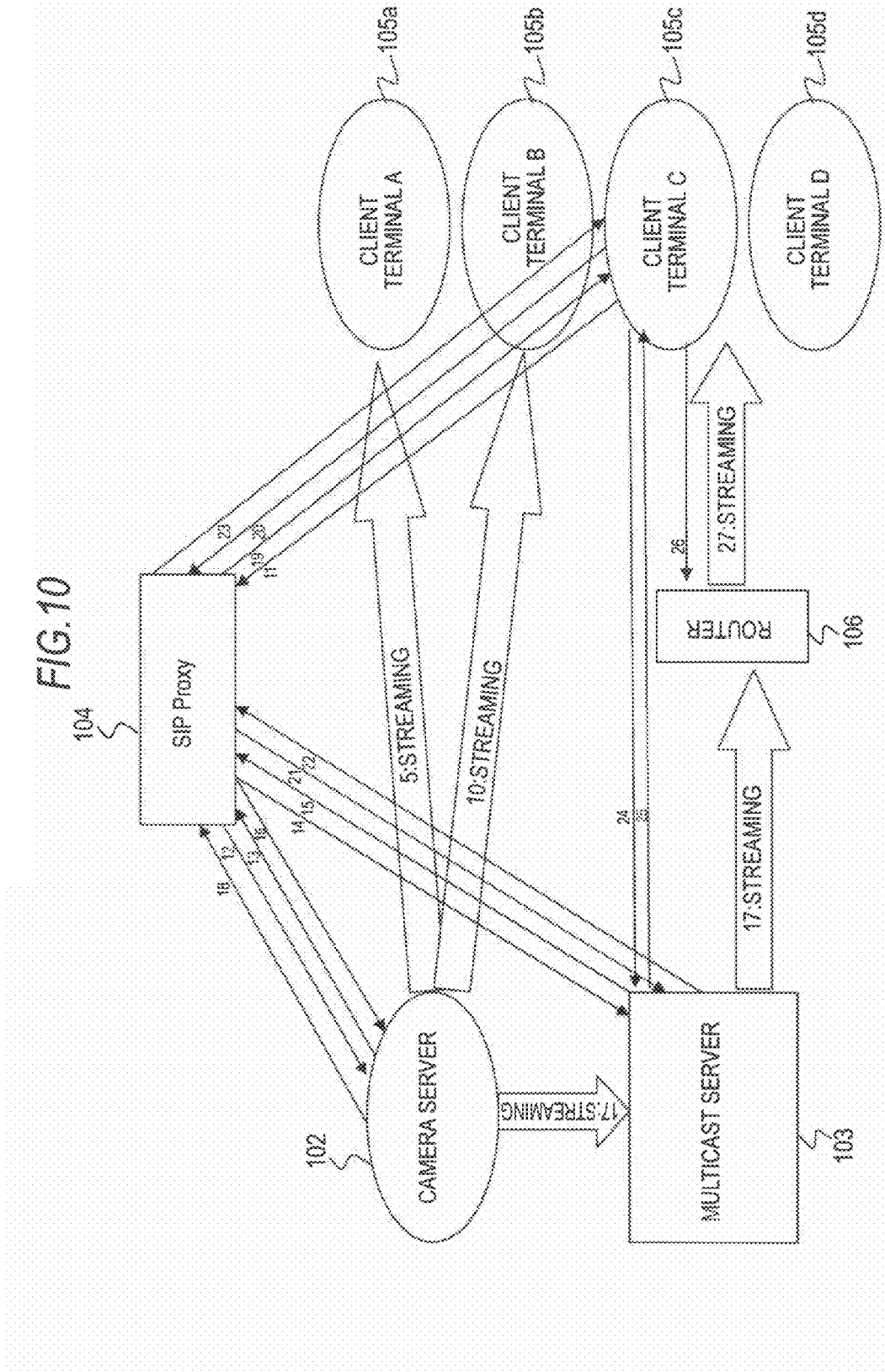
FIG. 10 is a block diagram for explaining an operation example of the content delivery system.
Figure 11:
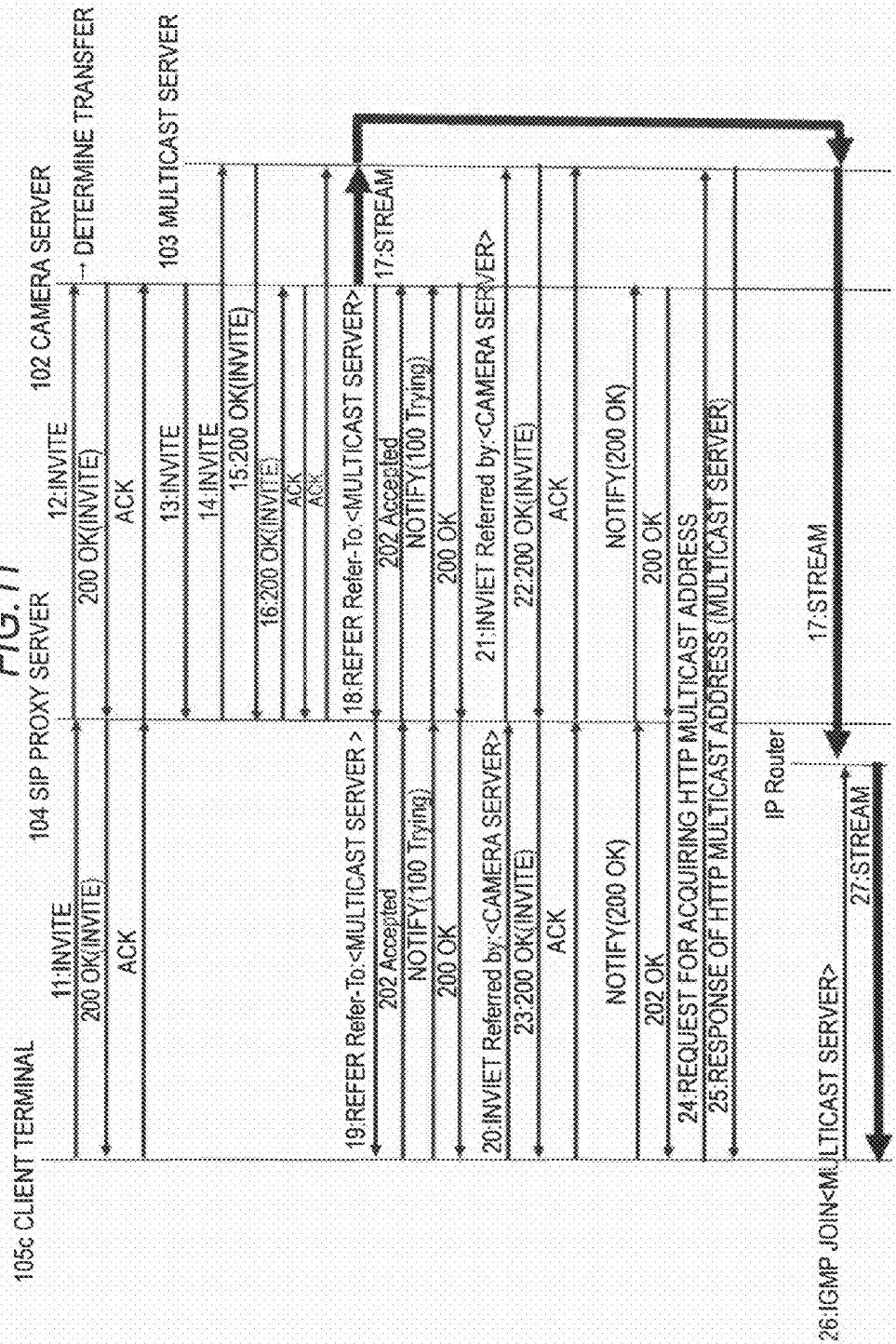
FIG. 11 is a sequence diagram for explaining an operation example of the content delivery system.

Next, another operation example performed when the delivery request is sent from the client terminal (client terminal C) 105c to the camera server 102 in a state in which taken image data (contents) is delivered from the camera server 102 to the client terminals 105a, 105b as described above will be explained with reference to FIG. 10 and FIG. 11.

(11) The client terminal 105c transmits the INVITE method (delivery request) which is the session start request to the SIP proxy server 104. (12) The SIP proxy server 104 transfers the INVITE method received from the client terminal 105c to the camera server 102. The camera server 102 receives the INVITE method transferred from the SIP proxy server 104.

The camera server 102 determines that the delivery is not able to be performed by the camera server 102 itself with respect to the received INVITE method, however, the camera server 102 transmits the response code "200 OK" indicating that the deliver request by the INVITE method has been accepted to the SIP proxy server 104. The SIP proxy server 104 transfers the response code "200 OK" received from the camera server 102 to the client terminal 105c. The client terminal 105c receives the response code "200 OK" transferred from the SIP proxy server 104.

Then, the client terminal 105c transmits the ACK method indicating that the response code "200 OK" has been received to the SIP proxy server 104. The SIP proxy server 104 transfers the ACK method received from the client terminal 105c to the camera server 102. The camera server 102 receives the ACK method transferred from the SIP proxy server 104.

(13) Since the camera server 102 has determines that the delivery is not able to be performed by the camera server 102 itself as described above, the camera server 102 transmits the INVITE method which is the session start request to the SIP proxy server 104. (14) The SIP proxy server 104 transfers the INVITE method received from the camera server 102 to the multicast server 103. The multicast server 103 receives the INVITE method transferred from the SIP proxy server 104.

(15) The multicast server 103 transmits the response code "200 OK" indicating that the session start request by the received INVITE method has been accepted to the SIP proxy server 104. (16) The SIP proxy server 104 transfers the response code of "200 OK" received from the multicast server 103 to the camera server 102. The camera server 102 receives the response code "200 OK" transferred from the SIP proxy server 104.

Then, the camera server 102 transmits the ACK method indicating that the response code "200 OK" has been received to the SIP proxy server 104. The SIP proxy server 104 transfers the ACK method received from the camera server 102 to the multicast server 103. The multicast server 103 receives the ACK method transferred from the SIP proxy server 104.

(17) According to the above procedure, a session between the camera server 102 and the multicast server 103 is established, and the camera server 102 transmits taken image data (stream) as a content to the multicast server 103.

(18) The camera server 102 transmits a REFFER method as a transfer command on which information of the multicast server 103 is put to the SIP proxy server 104. (19) The SIP proxy server 104 transfers the REFFER method received from the camera server 102 to the client terminal 105c. The client terminal 105c receives the REFFER method transferred from the SIP proxy server 104.

The client terminal 105c transmits a response code "202 Accepted" indicating that the transfer request has been agreed to the SIP proxy server 104. The SIP proxy server 104 transmits the response code "202 Accepted" received from the client terminal 105c to the camera server 102. The camera server 102 receives the response code "202 Accepted" transferred from the SIP proxy server 104.

The client terminal 105c also transmits a NOTFY method notifying that the transfer is in progress to the SIP proxy server 104. The SIP proxy server 104 transfers the NOTFY method received from the client terminal 105c to the camera server 102. The camera server 102 receives the NOTFY method transferred from the SIP proxy server 104.

Then, the camera server 102 transmits a response code "200 OK" indicating that the notification by the received NOTFY method has been accepted to the SIP proxy server 104. The SIP proxy server 104 transfers the response code "200 OK" received from the camera server 102 to the client terminal 105c. The client terminal 105c receives the response code "200 OK" transferred from the SIP proxy server 104.

(20) Then, the client terminal 105c transmits the INVITE method (delivery request) which is the session start request to the SIP proxy server 104 based on the transfer request from the camera server 102. (21) The SIP proxy server 104 transfers the INVITE method received from the client terminal 105c to the multicast server 103. At that time, the SIP proxy server 104 sets an HTTP session for requesting acquisition of the multicast address. The multicast server 103 receives the INVITE method transferred from the SIP proxy server 104.

(22) The multicast server 103 determines that the delivery can be performed by the multicast server 103 itself with respect to the received INVITE method, transmits the response code "200 OK" indicating that the delivery request by the INVITE method has been accepted to the SIP proxy server 104. (23) The SIP proxy server 104 transfers the response code "200 OK" received from the multicast server 103 to the client terminal 105c. The client terminal 105c receives the response code "200 OK" transferred from the SIP proxy server 104.

Then, the client terminal 105c transmits the ACK method indicating that the response code "200 OK" has been received to the SIP proxy server 104. The SIP proxy server 104 transfers the ACK method received from the client terminal 105c to the multicast server 103. The multicast server 103 receives the ACK method transferred from the SIP proxy server 104.

Then the client terminal 105c transmits the NOTFY method notifying that the delivery request has been accepted to the SIP proxy server 104. The SIP proxy server 104 transfers the NOTFY method received from the client terminal 105c to the camera server 102. The camera server 102 receives the NOTFY method transferred from the SIP proxy server 104.

The camera server 102 transmits the response code "200 OK" indicating that the notification by the received NOTFY method has been accepted to the SIP proxy server 104. The SIP proxy server 104 transfers the response code "200 OK" received from the camera server 102 to the client terminal 105c. The client terminal 105c receives the response code "200 OK" transferred from the SIP proxy server 104.

(24) Then, the client terminal 105c transmits a request for acquisition of the multicast address by using the HTTP (HyperText Transfer Protocol) session which has been established by the INVITE in (20) to (23). (25) Then, the client terminal 105c acquires multicast address information from the multicast server 103. (26) Then, the client terminal 105c transmits the IGMP (Internet Group Management Protocol) JOIN message which is a request for joining in the multicast group to the connected router 106 based on the transfer request from the camera server 102.

(27) According to the above procedure, the client terminal 105*c* can receive taken image data (stream) as a content transmitted from the camera server 102 through the multicast server 103.

As described above, in the content delivery system 100 shown in FIG. 1, the camera server 102 delivers contents to client terminals by the camera server itself while the number of deliveries is small and delivery requests from the client terminals can be responded, and is capable of delivering taken image data (contents) during the period without using the multicast server 103, which allows the delivery service business to start on a small scale.

When the number of deliveries is increased and it becomes difficult to respond to the delivery request from client terminal in the content delivery system 100 shown in FIG. 1, taken image data (contents) can be delivered by using the multicast server 103, which flexibly addresses the increase in the number of deliveries.

Figure 12:
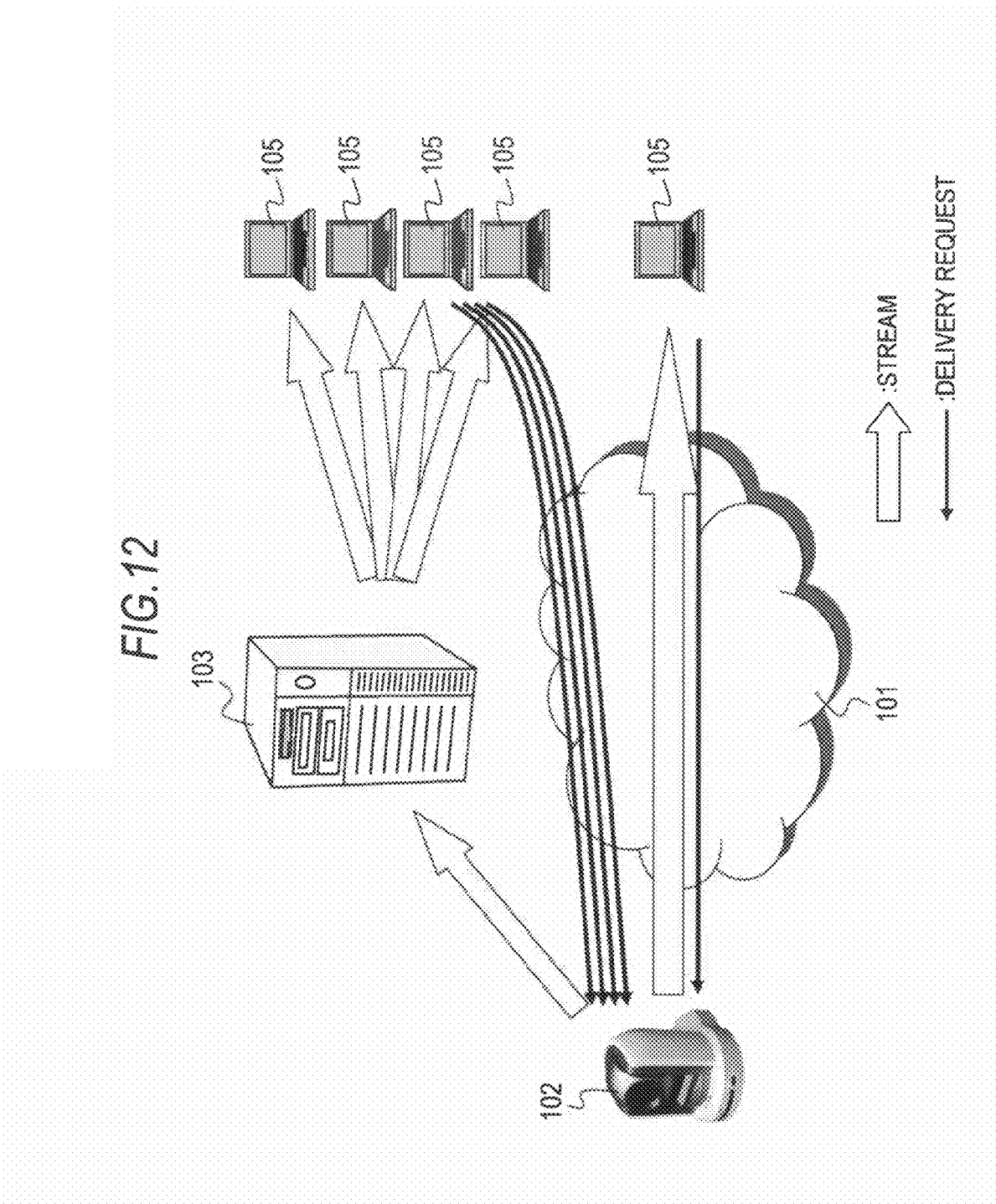
FIG. 12 is a view for explaining effects of the content delivery system according to an embodiment of the invention.

For example, in an example shown in FIG. 12, when there exists one client terminal 105 which makes delivery request, the camera server 102 delivers (transmits) taken image data by the camera server itself with respect to the delivery request from the client terminal 105. On the other hand, when there exist two or more client terminals 105 which make delivery requests, the multicast server 103 having high delivery performance, instead of the camera server 2 delivers (transmits) taken image data to the second client terminal and the subsequent client terminals 105.

2. Modification Example

Figure 13:
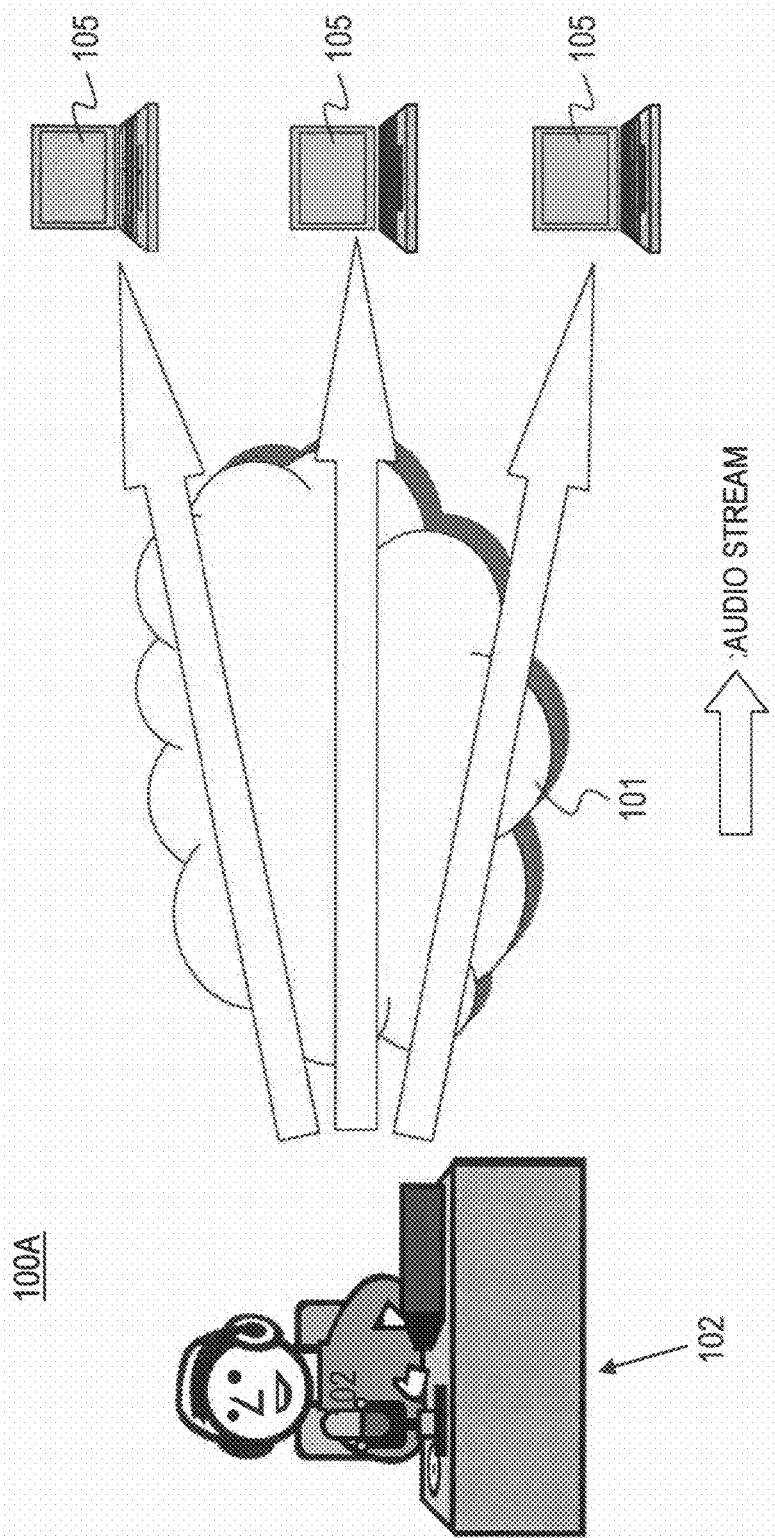
FIG. 13 is a view for explaining a modification example of the invention.
Figure 14:
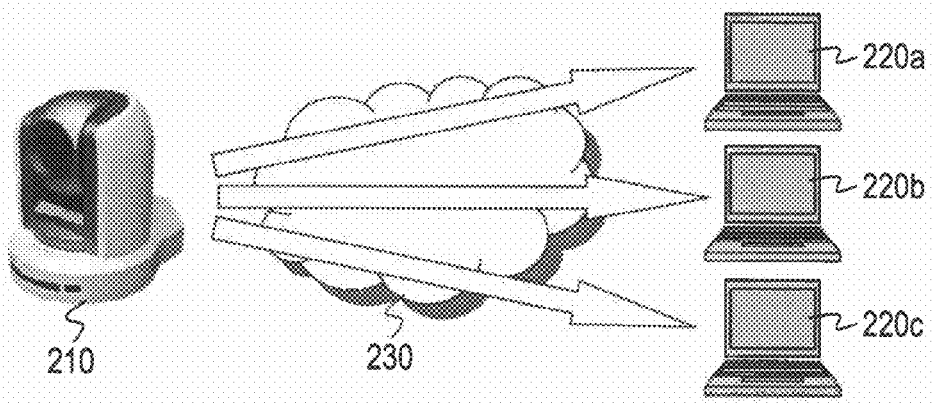
FIG. 14 is a view showing a state in which streaming delivery of taken image data is performed from a camera server as a delivery server to client terminals through a network.
Figure 15:
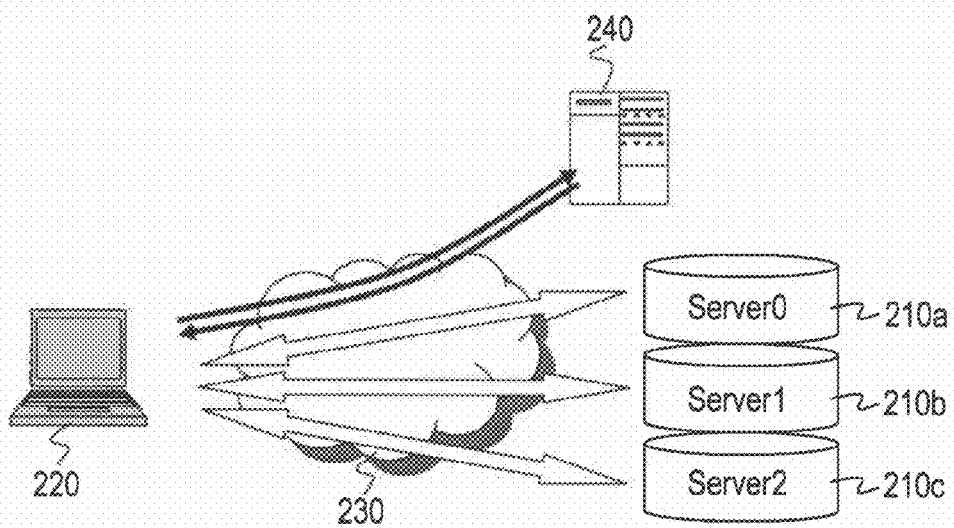
FIG. 15 is a view for explaining load balancing by a DNS (Domain Name System) as one of load balancing systems for increasing the number of deliveries.
Figure 16:
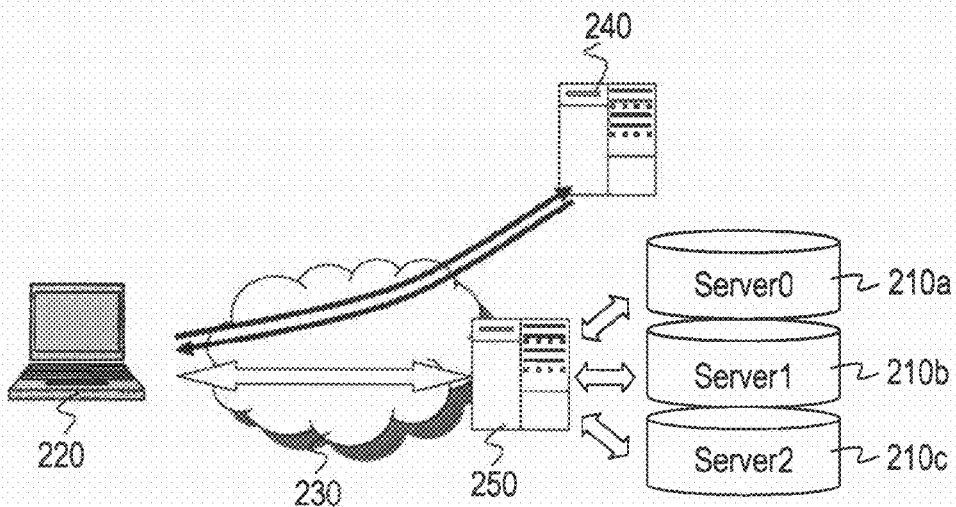
FIG. 16 is a view for explaining load balancing by a load balancer as one of load balancing systems for increasing the number of deliveries.

In the above embodiment, the example in which taken image data is delivered as a content has been shown, however, the content to be delivered is not limited to this. For example, it is possible to consider that a wideband and high quality audio stream can be delivered such as a content delivery system 100A shown in FIG. 13.

In the above embodiment, the example in which the network is the NGN has been shown, however, the invention can be also applied to cases in which contents are delivered through other networks such as Internet.

According to the embodiment of the invention, the delivery service can be started on a small scale, and the invention can be applied to the content delivery system which delivers contents to client terminals from the delivery server through the network.

The present application contains subject matter related to that disclosed in Japanese Priority Patent Application JP 2009-089698 filed in the Japan Patent Office on Apr. 2, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A delivery server comprising:
a processor including
a content output unit to output a content;
a delivery request receiving unit to receive delivery requests transmitted from client terminals connected to a network via a proxy server also connected to the network;
a determination unit to determine whether the delivery server can deliver content to all client terminals based on a number of delivery requests received; and
a transmitting unit to stream the content via the content output unit to all of the client terminals when delivery to all of the client terminals can be performed by the delivery server, and to stream the content to a subset of the client terminals and a multicast server connected to the network when delivery to all client terminals cannot be performed by the delivery server,
wherein the transmitting unit transmits an acknowledgement via the proxy server to all of the client terminals when delivery to all client terminals can be performed by the delivery server, and the transmitting unit transmits a transfer command via the proxy server to a second subset of the client terminals when delivery to all client terminals cannot be performed by the delivery server, the transfer command including information to establish sessions between the second subset of client terminals and the multicast server.

2. The delivery server according to claim 1, wherein the network is a next generation network (NGN).

3. The delivery server according to claim 1, wherein the content output unit is an imaging unit that images an object and that outputs taken image data corresponding to the object as the content.

4. A content delivery method in a delivery server including a processor that includes
a content output unit to output a content; and
a delivery request receiving unit to receive delivery requests transmitted from client terminals connected to a network via a proxy server also connected to the network, the method comprising:
determining, at the processor of the delivery server, whether the delivery server can deliver the content to all of the client terminals based on a number of delivery requests received;
streaming the content via the content output unit to all of the client terminals when delivery to all of the client terminals can be performed; and
streaming the content via the content output unit to a subset of the client terminals and a multicast server connected to the network when delivery to all of the client terminals cannot be performed by the delivery server,
wherein an acknowledgement is transmitted via the proxy server to all of the client terminals when delivery can be performed, and a transfer command is transmitted via the proxy server to a second subset of the client terminals when delivery to all of the client terminals cannot be performed by the delivery server, the transfer command including information to establish sessions between the second subset of the client terminals and the multicast server.

5. A multicast server comprising:
a processor including
a content receiving unit to receive a content delivered from a delivery server connected to a network when the delivery server cannot deliver the content to all client terminals requesting the content, and to receive transferred delivery requests for the content from the delivery server via a proxy server, the transferred delivery requests requesting delivery of the content to the a subset of all of the client terminals; and
a content delivery unit to perform multicasting of the content received by the content receiving unit to the network, and to respond to the delivery requests from the subset of all of the client terminals with acknowledgements sent to the subset of all of the client terminals via the proxy server.

6. The multicast server according to claim 5, wherein the network is a next generation network (NGN).

7. A content delivery method for a multicast server, comprising:
- receiving, at a processor of the multicast server, a content transmitted from a delivery server connected to a network when the content delivery server cannot deliver the content to all client terminals requesting the content;
- receiving, at the processor of the multicast server, transferred delivery requests for the content from the delivery server via a proxy server, the transferred delivery requests requesting delivery of the content to a subset of all of the client terminals;
- streaming, from the processor of the multicast server, acknowledgements of the transferred delivery requests via the proxy server to the subset of all of the client terminals; and
- performing, in the processor of the multicast server, multicasting of the content received from the delivery server to the network in response to the transferred delivery requests.

8. The delivery server according to claim 1, wherein the network is the Internet.

9. The multicast server according to claim 5, wherein the subset of all of the client terminals request an HTTP address from the multicast server in response to the acknowledgement.

10. The delivery server according to claim 1, wherein the transmitting unit further transmits the transfer command to the second subset of the client terminals.

11. The delivery server according to claim 10, wherein the second subset of the client terminals request to join a multicast group corresponding to the multicast server in response to receipt of the transfer command.

* * * * *